(12) United States Patent
Scott et al.

(10) Patent No.: US 8,184,626 B2
(45) Date of Patent: May 22, 2012

(54) HIGH-RADIX INTERPROCESSOR COMMUNICATIONS SYSTEM AND METHOD

(75) Inventors: Steven L. Scott, Chippewa Falls, WI (US); Dennis C. Abts, Eleva, WI (US); William J. Dally, Stanford, CA (US)

(73) Assignees: Cray Inc., Seattle, WA (US); The Board of Trustees of the Leland Stanford Junior University, Palo Alto, CA (US)

( * ) Notice: Subject to any disclaimer, the term of this patent is extended or adjusted under 35 U.S.C. 154(b) by 37 days.

(21) Appl. No.: 12/352,443

(22) Filed: Jan. 12, 2009

(65) Prior Publication Data

US 2009/0292855 A1    Nov. 26, 2009

Related U.S. Application Data

(63) Continuation of application No. 12/107,011, filed on Apr. 21, 2008, now abandoned.

(60) Provisional application No. 60/925,470, filed on Apr. 20, 2007.

(51) Int. Cl.
*H04L 12/50* (2006.01)

(52) U.S. Cl. ............ 370/362; 370/364; 370/539; 700/2; 700/4; 710/51; 710/52

(58) Field of Classification Search .................. 370/255, 370/257, 352, 356, 359, 360, 362, 364, 369, 370/537; 700/2, 4; 710/5, 7, 51, 52, 316
See application file for complete search history.

(56) References Cited

U.S. PATENT DOCUMENTS

| | | | | |
|---|---|---|---|---|
| 4,528,641 A * | 7/1985 | Burrows | ....................... | 708/625 |
| 5,105,378 A * | 4/1992 | Mori | ............................. | 708/650 |
| 5,179,558 A * | 1/1993 | Thacker et al. | ............... | 370/406 |
| 5,841,775 A * | 11/1998 | Huang | .......................... | 370/422 |
| 6,081,507 A * | 6/2000 | Chao et al. | ..................... | 370/235 |
| 6,101,181 A * | 8/2000 | Passint et al. | ................. | 370/352 |
| 6,212,184 B1 * | 4/2001 | Venkatachary et al. | ....... | 370/392 |
| 6,233,248 B1 * | 5/2001 | Sautter et al. | ................. | 370/465 |
| 6,278,714 B1 * | 8/2001 | Gupta | ........................... | 370/422 |
| 6,625,633 B1 * | 9/2003 | Hirairi | .......................... | 708/650 |
| 6,680,915 B1 * | 1/2004 | Park et al. | ..................... | 370/254 |
| 6,757,779 B1 * | 6/2004 | Nataraj | ......................... | 711/108 |

(Continued)

OTHER PUBLICATIONS

"Microarchitecture of a high radix router"; Kim, J. ; Dally, W.J. ; Towles, B. ; Gupta, A.K.; Computer Architecture, 2005. ISCA '05. Proceedings. 32nd International Symposium on Computer Architecture; Jun. 20, 2005 (publication date).*

(Continued)

*Primary Examiner* — Kwang B Yao
*Assistant Examiner* — Benjamin H Elliott, IV (57) ABSTRACT

A high-radix interprocessor communications system and method having a plurality of processor nodes, a plurality of first routers and a plurality of second routers. Each first router is connected to a processor node and to two or more second routers. Each first router includes input ports, output ports, row busses, columns channels and a plurality of subswitches arranged in a n x p matrix. Each row bus receives data from one of the plurality of input ports and distributes the data to two or more of the plurality of subswitches. Each column distributes data from one or more subswitches to one or more output ports. Each row bus includes a route selector, wherein the route selector includes a routing table which selects an output port for each packet and which routes the packet through one of the row busses to the selected output port.

13 Claims, 8 Drawing Sheets

U.S. PATENT DOCUMENTS

| | | | |
|---|---|---|---|
| 6,771,673 B1* | 8/2004 | Baum et al. | 370/535 |
| 6,940,807 B1* | 9/2005 | Rezvani et al. | 370/210 |
| 6,990,096 B2* | 1/2006 | Norman et al. | 370/386 |
| 7,167,891 B2* | 1/2007 | Tang et al. | 708/654 |
| 7,205,881 B2* | 4/2007 | Reed et al. | 340/2.24 |
| 7,272,648 B2* | 9/2007 | Kawasaki et al. | 709/224 |
| 7,321,594 B2* | 1/2008 | Murakami et al. | 370/412 |
| 7,362,764 B2* | 4/2008 | Johnsen et al. | 370/395.21 |
| 7,555,493 B2* | 6/2009 | Khayter et al. | 1/1 |
| 7,673,087 B1* | 3/2010 | Ansari et al. | 710/241 |
| 7,830,905 B2* | 11/2010 | Scott et al. | 370/419 |
| 7,843,929 B2 | 11/2010 | Scott et al. | |
| 2002/0126657 A1* | 9/2002 | Frouin et al. | 370/352 |
| 2004/0076040 A1* | 4/2004 | Pfeiffer et al. | 365/199 |
| 2004/0267958 A1* | 12/2004 | Reed et al. | 709/238 |
| 2005/0018609 A1* | 1/2005 | Dally et al. | 370/235 |
| 2006/0159095 A1* | 7/2006 | Cook et al. | 370/392 |
| 2006/0251092 A1* | 11/2006 | Matterne et al. | 370/412 |
| 2007/0008949 A1* | 1/2007 | Balandin | 370/351 |
| 2008/0126620 A1* | 5/2008 | Vashisth et al. | 710/52 |
| 2008/0285562 A1* | 11/2008 | Scott et al. | 370/392 |
| 2008/0317016 A1* | 12/2008 | Beshai | 370/380 |
| 2009/0292855 A1* | 11/2009 | Scott et al. | 710/316 |
| 2011/0051724 A1* | 3/2011 | Scott et al. | 370/389 |

OTHER PUBLICATIONS

Kim, J., et al., "Microarchitecture of a high radix router", Computer Architecture, 2005. ISCA '05 Proceedings, 32nd International Symposium on Computer Architecture, Jun. 4-8, 2005, 1063-6897/05 $20.00 @2005 IEEE, (Jun. 4, 2005), 420-431.

"U.S. Appl. No. 12/107,016 Notice of Allowance mailed Jul. 21, 2010", 7 pgs.

"U.S. Appl. No. 12/107,016, Non-Final Office Action mailed Mar. 2, 2010", 7 pgs.

"U.S. Appl. No. 12/107,016, Response filed Jun. 30, 2010 to Non Final Office Action mailed Mar. 2, 2010", 7 pgs.

* cited by examiner

HIGH-RADIX INTERPROCESSOR COMMUNICATIONS SYSTEM AND METHOD

RELATED APPLICATIONS

This application is a continuation under 37 C.F.R. 1.53(b) of U.S. patent application Ser. No. 12/107,011 filed Apr. 21, 2008 now abandoned, which claims the benefit under 35 U.S.C. 119(e) of U.S. Provisional Application Ser. No. 60/925,470 filed Apr. 20, 2007; which applications are incorporated herein by reference in their entirety.

This application is related to U.S. patent application Ser. No. 12/107,016, entitled "FLEXIBLE ROUTING TABLES FOR A HIGH-RADIX ROUTER", filed on Apr. 21, 2008; to U.S. patent application Ser. No. 12/107,036, entitled "SPECULATIVE FORWARDING IN A HIGH-RADIX ROUTER", filed on Apr. 21, 2008; and to U.S. patent application Ser. No. 12/107,019, entitled "LOAD BALANCING FOR COMMUNICATIONS WITHIN A MULTIPROCESSOR COMPUTER SYSTEM", filed on Apr. 21, 2008; each of which is incorporated herein by reference in its entirety.

FEDERALLY SPONSORED RESEARCH OR DEVELOPMENT

The U.S. Government has a paid-up license in this invention and the right in limited circumstances to require the patent owner to license others on reasonable terms as provided for by the terms of contract No. MDA904-02-3-0052, awarded by the Maryland Procurement Office.

BACKGROUND OF THE INVENTION

1. Field of the Invention

The present invention is related to multiprocessor computer systems, and more particularly to a system and method for routing packets in a multiprocessor computer system.

2. Background Information

The interconnection network plays a critical role in the cost and performance of a scalable multiprocessor. It determines the point-to-point and global bandwidth of the system, as well as the latency for remote communication. Latency is particularly important for shared-memory multiprocessors, in which memory access and synchronization latencies can significantly impact application scalability, and is becoming a greater concern as system sizes grow and clock cycles shrink.

Over the past 15 years the vast majority of interconnection networks have used low-radix topologies. Many multiprocessors have used a low-radix k-ary n-cube or torus topology, including the SGI Origin2000 hypercube, the dual-bristled, sliced 2-D torus of the Cray X1, the 3-D torus of the Cray T3E and Cray XT3, and the torus of the Alpha 21364. The Quadrics switch uses a radix-8 router, the Mellanox router is radix-24, and the highest radix available from Myrinet is radix-32. The IBM SP2 switch is radix-8.

A low-radix fat-tree topology was used in the CM-5, and this topology is also used in many clusters, including the Cray XD1.

During the past 15 years, the total bandwidth per router has increased by nearly three orders of magnitude, due to a combination of higher pin density and faster signaling rates, while typical packet sizes have remained roughly constant. As noted by J. Kim, et al. in "Microarchitecture of a high-radix router," *ISCA '05: Proceedings of the 32nd Annual International Symposium on Computer Architecture*, pages 420-431, Madison, Wis., USA, 2005. IEEE Computer Society, this increase in router bandwidth relative to packet size computer designers to build networks built from many thin links rather than fewer fat links as in the recent past. Kim concludes that building a network using high-radix routers with many narrow ports reduces the latency and cost of the resulting network.

What is needed is a system and method for efficiently routing packets through a multiprocessor computer system.

BRIEF DESCRIPTION OF THE DRAWINGS

FIG. 3 (a)-(c) illustrate network topologies for computer systems;

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
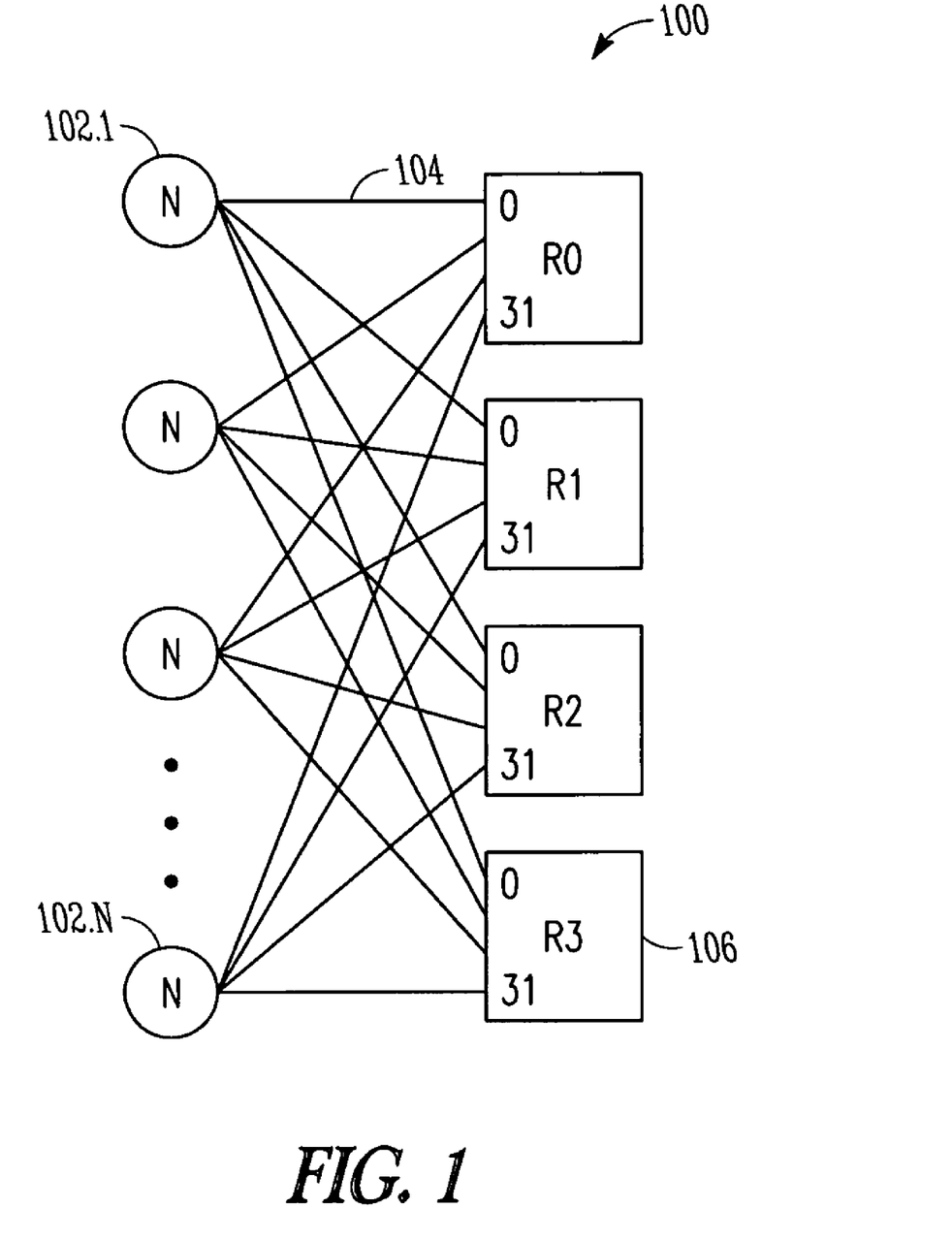
FIG. 1 illustrates a computer system with a high-radix routing system.

A computer system is shown in FIG. 1. In the computer system 100 of FIG. 1, processor nodes 102.1 through 102.N are connected by links 104 to routers 106. In the embodiment shown, each processor node 102 includes four injection ports, wherein each connection port is connected to a different router 106. In addition, each processor node 102 includes local memory and one or more processors. Each router 106 is a high-radix router as will be described below.

In one embodiment, computer system 100 is designed to run demanding applications with high communication requirements. It is a distributed shared memory multiprocessor built with high performance, high bandwidth custom processors. The processors support latency hiding, addressing and synchronization features that facilitate scaling to large system sizes.

It provides a globally shared memory with direct global load/store access. In one such embodiment, system 100 is globally cache coherent, but each processor only caches data from memory 112 within its four-processor node 102. This provides natural support for SMP applications on a single node, and hierarchical (e.g.: shmem or MPI on top of OpenMP) applications across the entire machine. Pure distributed memory applications (MPI, shmem, CAF, UPC) are supported as well.

In one such embodiment, each processor is implemented on a single chip and includes a 4-way-dispatch scalar core, 8 vector pipes, two levels of cache and a set of ports to the local memory system. Each processor in system 100 can support thousands of outstanding global memory references.

For such embodiments, the network should be designed to provide very high global bandwidth, while also providing low latency for efficient synchronization and scalability. To accomplish this, in one embodiment, routers 106 are interconnected in a high-radix folded Clos or fat-tree topology with sidelinks. By providing sidelinks, one can statically partition the global network bandwidth among the peer subtrees, reducing the cost and the latency of the network.

Figure 2:
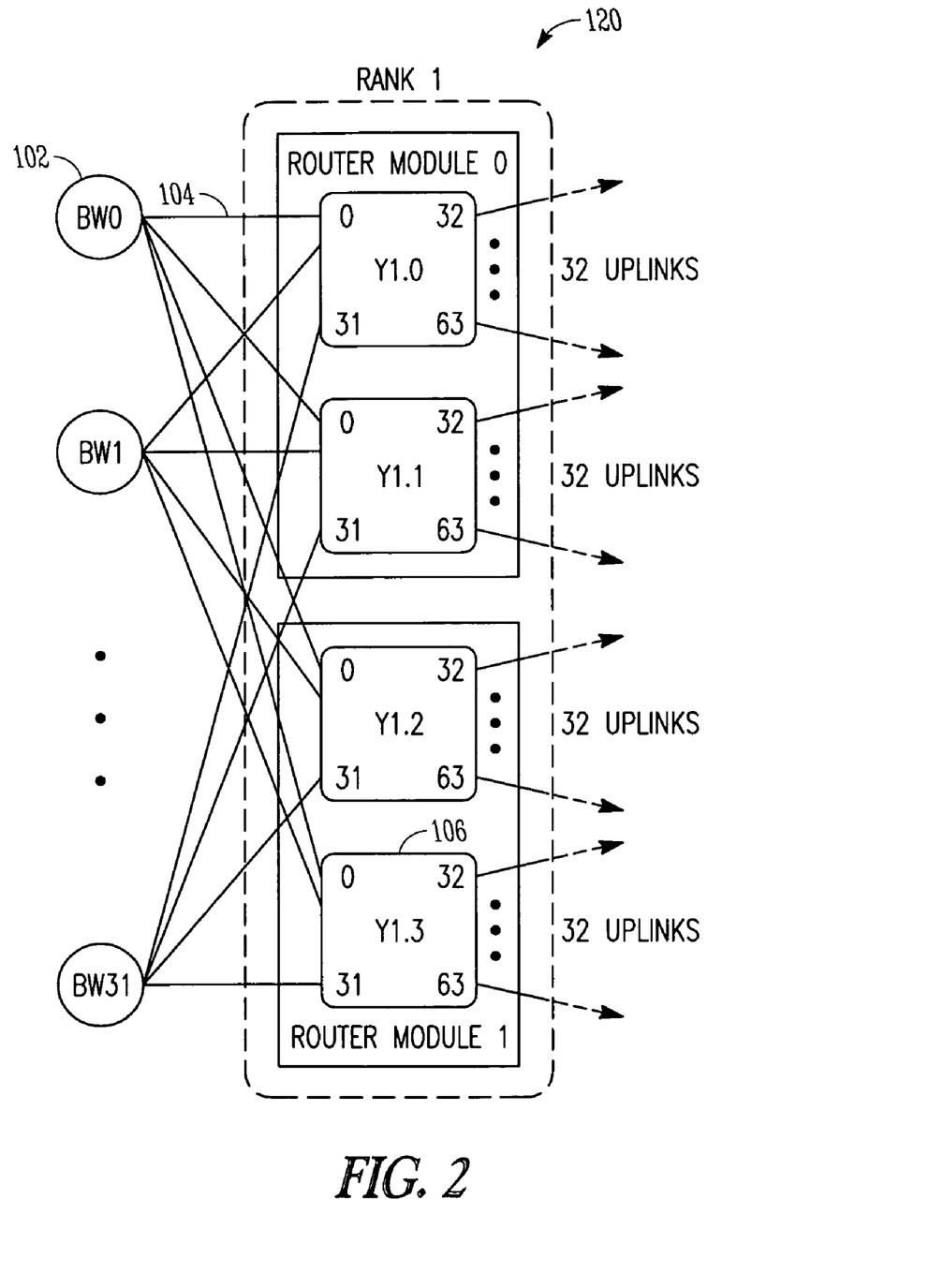
FIG. 2 illustrates the computer system of FIG. 1 with uplinks to higher rank routers.

In the embodiment shown in FIG. 2, computer system 120 uses high-radix routers 106, each of which has 64 ports that are three bits wide in each direction. In the embodiment shown, each processor node 102 has four injection ports into the network, with each port connecting to a different network slice. Each slice is a completely separate network with its own set of routers 106. The following discussion will focus on a single slice of the network.

By using a high-radix router with many narrow channels we are able to take advantage of the higher pin density and faster signaling rates available in modern ASIC technology. In one embodiment, router 106 is an 800 MHz ASIC with 64 18.75 Gb/s bidirectional ports for an aggregate offchip bandwidth of 2.4 Tb/s. Each port consists of three 6.25 Gb/s differential signals in each direction. The router supports deterministic and adaptive packet routing with separate buffering for request and reply virtual channels. The router is organized hierarchically as an 8×8 array of tiles which simplifies arbitration by avoiding long wires in the arbiters. Each tile of the array contains a router port, its associated buffering, and an 8×8 router subswitch.

In one embodiment, computer system 120 scales up to 32K processors using a variation on a folded-Clos or fat-tree network topology that can be incrementally scaled. In one such embodiment, computer system 120 is packaged in modules, chassis, and cabinets. Each compute module contains eight processors with four network ports each.

In one embodiment, a chassis holds eight compute modules organized as two 32-processor rank 1 (R1) subtrees, and up to four R1 router modules (each of which provides two network slices for one of the subtrees). Each R1 router module contains two 64-port YARC router chips (see FIG. 2) providing 64 downlinks that are routed to the processor ports via a mid-plane, and 64 uplinks (or sidelinks) that are routed to eight 96-pin cable connectors that carry eight links each. ("YARC" stands for "Yet Another Routing Chip.")

Figure 3A:
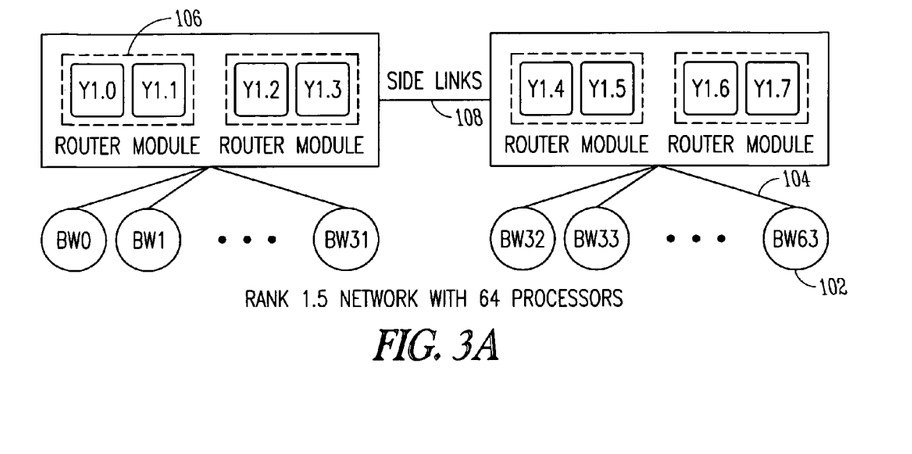
Figure 3B:
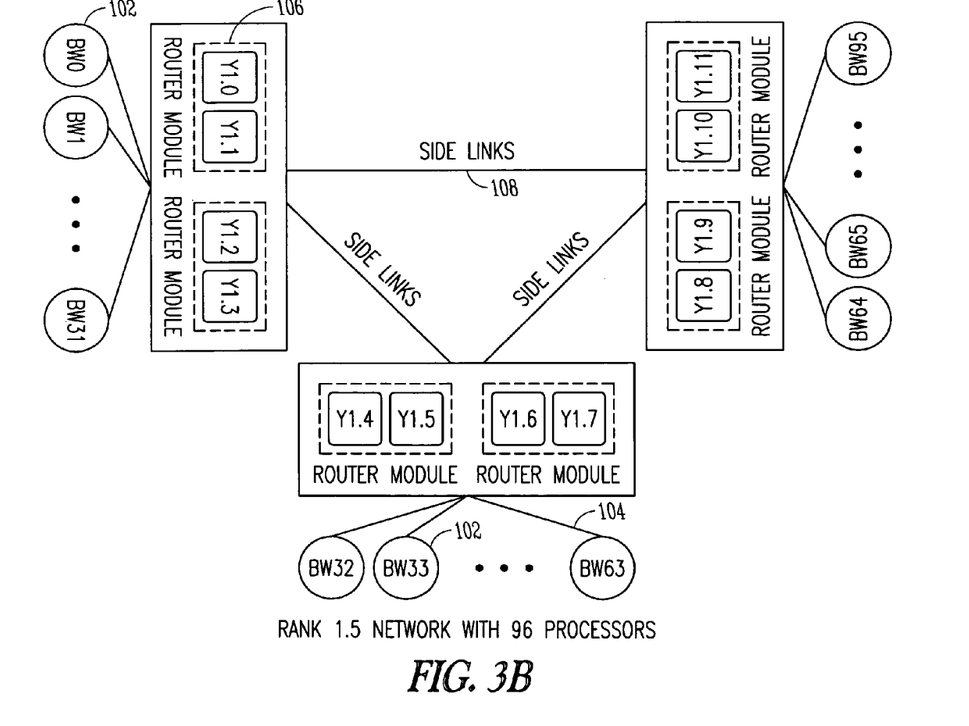

In one such embodiment, each cabinet holds two chassis (128 processors) organized as four 32-processors R1 subtrees. Machines with up to 288 processors, nine R1 subtrees, can be connected by directly cabling the R1 subtrees to one another using sidelinks 108 as shown in FIGS. 3(a) and (b) to create a rank 1.5 (R1.5) network.

To scale beyond 288 processors, uplink cables 110 from each R1 subtree are connected to rank 2 (R2) routers 112. A rank 2/3 router module (FIG. 3(c)) packages four routers 106 on an R2/R3 module.

In one embodiment, the four radix-64 routers 106 on the R2/R3 module are each split into two radix-32 virtual routers. Logically, each R2/R3 module has eight radix-32 routers providing 256 network links on 32 cable connectors. Up to 16 R2/R3 router modules are packaged into a stand-alone router cabinet.

Machines of up to 1024 processors can be constructed by connecting up to thirty-two 32-processor R1 subtrees to R2 routers. Machines of up to 4.5K processors can be constructed by connecting up to nine 512-processor R2 subtrees via side links 108. Up to 16K processors may be connected by a rank 3 (R3) network where up to thirty-two 512-processor R2 subtrees are connected by R3 routers. Networks having up to 72K processors could be constructed by connecting nine R3 subtrees via side links 108.

The above topology and packaging scheme enables very flexible provisioning of network bandwidth. For instance, by only using a single rank 1 router module (instead of two as shown in FIG. 2), the port bandwidth of each processor is reduced in half—halving both the cost of the network and its global bandwidth. An additional bandwidth taper can be achieved by connecting only a subset of the rank 1 to rank 2 network cables, reducing cabling cost and R2 router cost at the expense of the bandwidth taper.

The Router

The input-queued crossbar organization often used in low-radix routers does not scale efficiently to high radices because the arbitration logic and wiring complexity both grow quadratically with the number of inputs. To overcome this complexity, in one embodiment, router 106 is organized using a hierarchical organization in a manner similar to that proposed by Kim et al. above.

Figure 4:
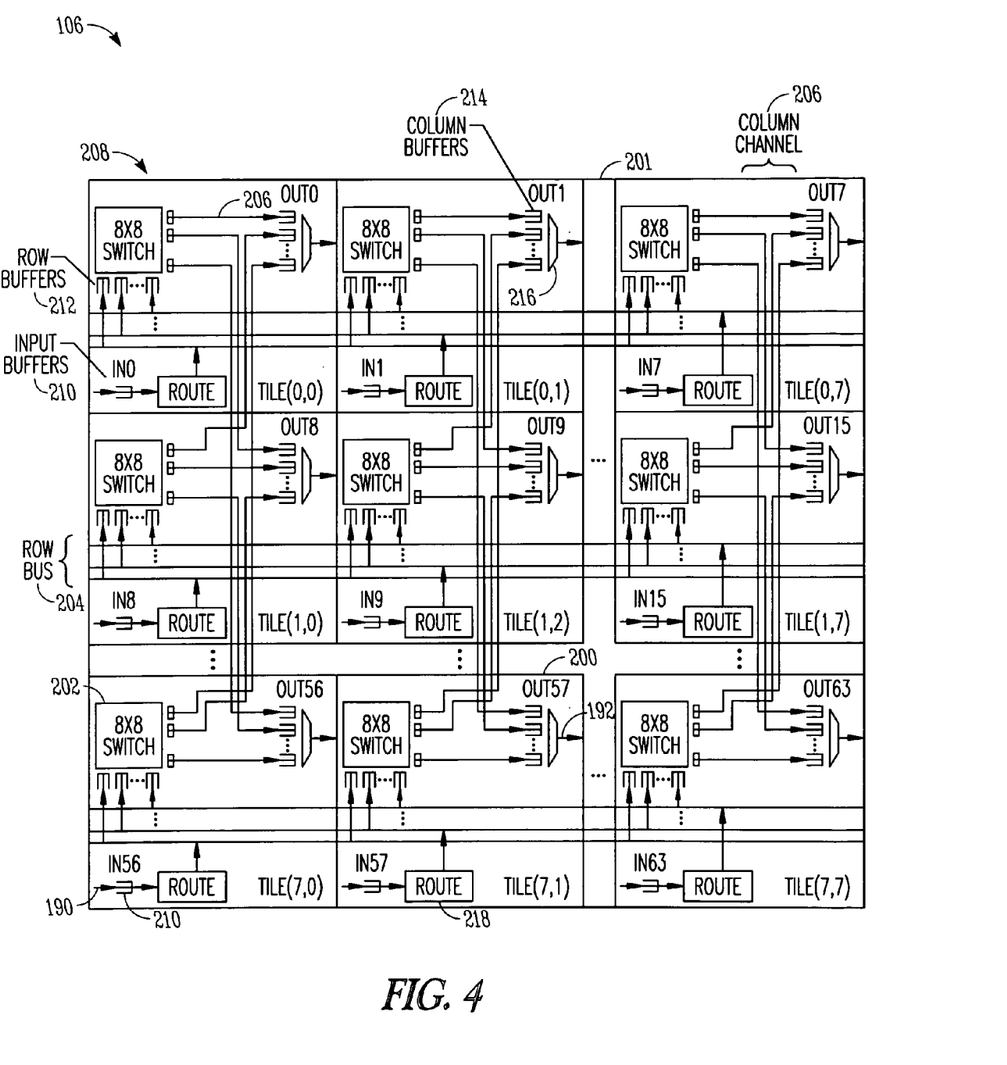
FIG. 4 illustrates one embodiment of a router for systems of FIGS. 1-3.

As shown in FIG. 4, in one embodiment router 106 is organized as an 8×8 array of tiles 200 within a single YARC chip 201. Each tile 200 contains all of the logic and buffering associated with one input port 190 and one output port 192. Each tile 200 also contains an 8×8 switch 202 and associated buffers (212, 214). Each tile's switch 202 accepts inputs from eight row buses 204 that are driven by the input ports 190 in its row, and drives separate output channels 206 to the eight output ports 192 in its column. Using a tile-based microarchitecture facilitates implementation, since each tile is identical and produces a very regular structure for replication and physical implementation in silicon.

In one embodiment, computer systems 100 and 120 use two virtual channels (VCs), designated request (v=0) and response (v=1) to avoid request-response deadlocks in the network. Therefore, all buffer resources are allocated according to the virtual channel bit in the head phit. Each input buffer is 256 phits and is sized to cover the round-trip latency across the network channel. Virtual cut-through flow control is used across the network links. In one such embodiment, each VC drives its own row bus 204. This provides some row bus speedup since you can flow request and response flits onto row busses simultaneously. It also eliminates the need for arbitration for the row busses 204.

The router 106 microarchitecture is best understood by following a packet through the router. A packet (such as packet 300 shown in FIG. 6) arrives in the input buffer 210 of a tile 200. (Fed from the incoming link control block (LCB).)

When the packet reaches the head of the buffer a routing decision is made at route selector 218 to select the output column 208 for the packet. The packet is then driven onto the row bus 204 associated with the input port 190 and buffered in a row buffer 212 at the input of the 8×8 switch 202 at the junction of the packet's input row and output column. At this point the routing decision must be refined to select a particular output port 192 within the output column 208. The switch 202 then routes the packet to the column channel 206 associated with the selected output port 192. The column channel delivers the packet to an output buffer 214 (associated with the input row) at the output port multiplexer 216. Packets in the per-input-row output buffers 214 arbitrate for access to the output port 192 and, when granted access, are switched onto output port 192 via the multiplexer 216.

In the embodiment shown in FIG. 4, router 106 includes three types of buffers: input buffers 210, row buffers 212, and column buffers 214. Each buffer is partitioned into two virtual channels. One input buffer 210 and 8 row buffers 212 are associated with each input port 190. Thus, no arbitration is needed to allocate these buffers—only flow control. Eight column buffers 214 are associated with each subswitch 202. Allocation of the column buffers 214 takes place at the same time the packet is switched.

Output arbitration is performed in two stages. The first stage of arbitration is done to gain access to the output of the subswitch 202. A packet then competes with packets from other tiles 200 in the same column 208 in the second stage of arbitration for access to the output port 192. Unlike the hierarchical crossbar in Kim, however, router 106 takes advantage of the abundant on-chip wiring resources to run separate channels 206 from each output of each subswitch 202 to the corresponding output port 192. This organization places the column buffers 214 in the output tiles 200 rather than at the output of the subswitches 202. Co-locating the eight column buffers 214 associated with a given output in a single tile 200 simplifies global output arbitration. With column buffers 214 at the outputs of the subswitch 202, the requests/grants to/from the global arbiters would need to be pipelined to account for wire delay, which would complicate the arbitration logic.

Figure 5:
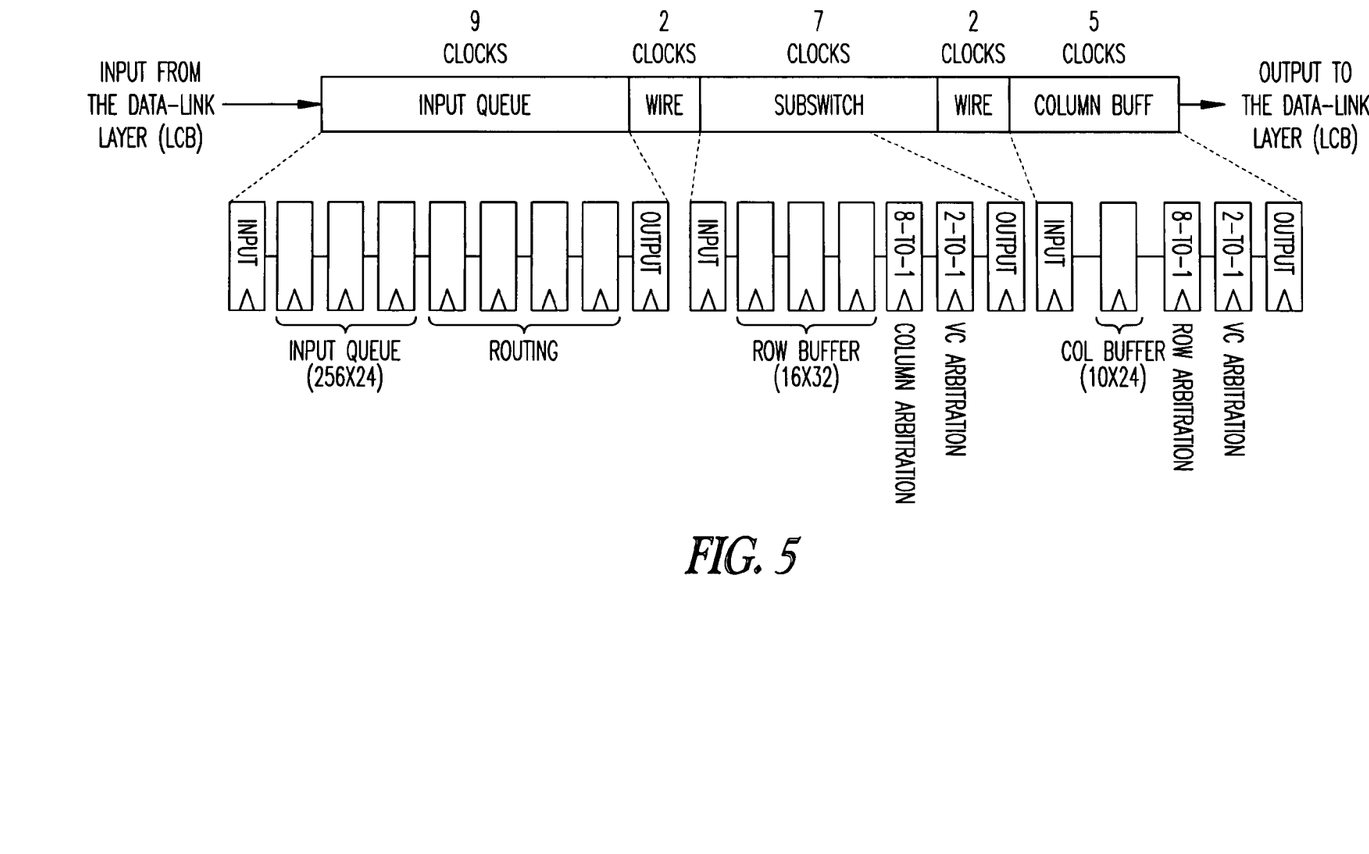
FIG. 5 illustrates latency in transfer of a packet through the router of FIG. 4.

In one embodiment of the router 106 of FIG. 4, a packet traversing router 106 passes through 25 pipeline stages, resulting in a zero-load latency of 31.25 ns. A pipeline diagram illustrating passage through such a router 106 is shown in FIG. 5. In one embodiment, each major block: input queue (210, 212), subswitch 202, and column buffers 214 is designed with both input and output registers. This approach simplified system timing and design at the expense of latency. During the design, additional pipeline stages were inserted to pipeline the wire delay associated with the row busses and the column channels.

The Communication Stack

The communication stack in computer systems 100 and 120 can be considered as three layers: network layer, data-link layer, and physical layer. We discuss the packet format, flow control across the network links, the link control block (LCB) which implements the data-link layer, and the serializer/deserializer (SerDes) at the physical layer.

Figure 6:
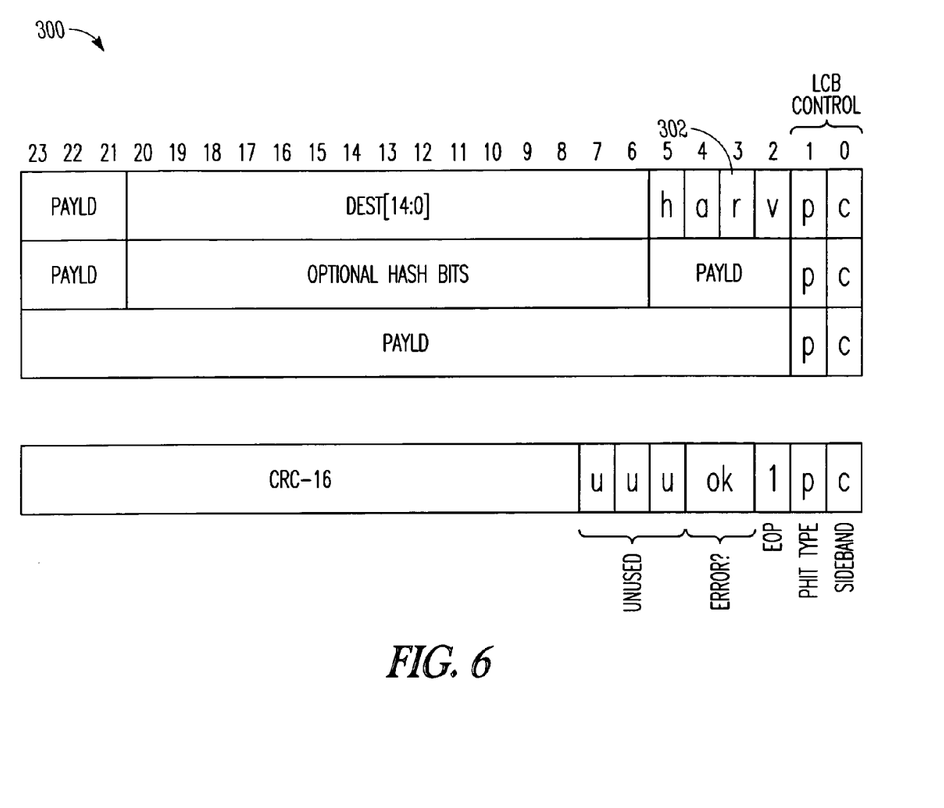
FIG. 6 illustrates one example embodiment of a packet format that can be used in the router of FIG. 4.

One embodiment of a packet that can be used in computer systems 100 and 120 is shown in FIG. 6. In one embodiment, packets are divided into 24-bit phits for transmission over internal datapaths. These phits are further serialized for transmission over 3-bit wide network channels. A minimum packet contains 4 phits carrying 32 payload bits.

Longer packets are constructed by inserting additional payload phits (like the third phit in the figure) before the tail phit. Two-bits of each phit, as well as all of the tail phit are used by the data-link layer.

The head phit of the packet controls routing. In addition to specifying the destination, this phit contains a v bit that specifies which virtual channel to use, and three bits, h, a, and r, that control routing.

If the r bit is set, the packet will employ source routing. That is, the packet header will be accompanied by a routing vector that indicates the path through the network as a list of ports used to select the output port 192 at each hop. Source routed packets are normally used only for maintenance operations such as reading and writing configuration registers on router 106.

If the a bit is set, the packet will route adaptively, otherwise it will route deterministically.

If the h bit is set, the deterministic routing algorithm employs the hash bits in the second phit to select the output port 192.

Network flow control will be discussed next. The allocation unit for flow control is a 24-bit phit-thus, the phit is really the flit (flow control unit). In one embodiment, as noted above, computer systems 100 and 120 use two virtual channels (VCs), designated request (v=0) and response (v=1) to avoid request-response deadlocks in the network. Therefore, all buffer resources are allocated according to the virtual channel bit in the head phit. Each input buffer is 256 phits and is sized to cover the round-trip latency across the network channel. Virtual cut-through flow control is used across the network links. In one embodiment, each VC drives its own row bus 204.

The data-link layer will be discussed next. In one embodiment, the data-link layer protocol is implemented by the link control block. The LCB receives phits from router 106 and injects them into the serializer logic where they are transmitted over the physical medium. The incoming LCB feeds directly to the input buffers 210.

The primary function of the LCB is to reliably transmit packets over the network links using a sliding window go-back-N protocol. The send buffer storage and retry is on a packet granularity. The link control block is described in greater detail in "Inter-ASIC Data Transport Using Link Control Block Manager," U.S. patent application Ser. No. 11/780, 258, filed Jul. 19, 2007, the description of which is incorporated by reference.

In the embodiment shown in FIG. 6, the 24-bit phit uses 2-bits of sideband dedicated as a control channel for the LCB to carry sequence numbers and status information. The virtual channel acknowledgment status bits travel in the LCB sideband. These VC acks are used to increment the pervc credit counters in the output port logic. The ok field in the EOP phit indicates if the packet is healthy, encountered a transmission error on the current link (transmit_error), or was corrupted prior to transmission (soft_error).

CRC is used to detect soft errors in the pipeline data paths and static memories used for storage. Before transmitting a tail phit onto the network link, the LCB will check the current CRC against the packet contents to determine if a soft error has corrupted the packet. If the packet is corrupted, it is marked as soft_error, and a good CRC is generated so that it is not detected by the receiver as a transmission error. The packet will continue to flow through the network marked as a bad packet with a soft error and eventually be discarded by the network interface at the destination processor.

The narrow links of a high-radix router cause a higher serialization latency to squeeze the packet over a link. For example, a 32 B cache-line write results in a packet with 19 phits (6 header, 12 data, and 1 EOP). Consequently, the LCB passes phits up to the higher-level logic speculatively, prior to verifying the packet CRC, which avoids store-and-forward serialization latency at each hop. However, this early forwarding complicates various error conditions in order to correctly handle a packet with a transmission error and reclaim the space in the input queue at the receiver.

Because a packet with a transmission error is speculatively passed up to the router core and may have already flowed to the next router by the time the tail phit is processed, the LCB and input queue must prevent corrupting the router state. The LCB detects packet CRC errors and marks the packet as transmit_error with a corrected CRC before handing the end-of-packet (EOP) phit up to the router core. The LCB also monitors the packet length of the received data stream and clips any packets that exceed the maximum packet length, which is programmed into an LCB configuration register. When a packet is clipped, an EOP phit is appended to the truncated packet and it is marked as transmit_error. In one embodiment, the LCB will enter error recovery mode on either error and await the retransmission.

The input queue in the router must protect from overflow. If it receives more phits than can be stored, the input queue logic will adjust the tail pointer to excise the bad packet and discard further phits from the LCB until the EOP phit is received. If a packet marked transmit_error is received at the input buffer, we want to drop the packet and avoid sending any virtual channel acknowledgments. The sender will eventually timeout and retransmit the packet. If the bad packet has not yet flowed out of the input buffer, it can simply be removed by setting the tail pointer of the queue to the tail of the previous packet. Otherwise, if the packet has flowed out of the input buffer, we let the packet go and decrement the number of virtual channel acknowledgments to send by the size of the bad packet. The transmit-side router core does not need to know anything about recovering from bad packets. All effects of the error are contained within the LCB and router input queueing logic.

The physical layer will be discussed next. The serializer/deserializer (SerDes) implements the physical layer of the communication stack. In one embodiment, router 106 instantiates a high-speed SerDes in which each lane consists of two complimentary signals making a balanced differential pair.

In one embodiment, the SerDes is organized as a macro which replicates multiple lanes. For full duplex operation, an 8-lane receiver and an 8-lane transmitter macro are instantiated. In one such embodiment, router 106 instantiates forty-eight (48) 8-lane SerDes macros, twenty-four (24) 8-lane transmit and twenty-four (24) 8-lane receive macros, consuming approximately of the available silicon in a full ASIC implementation of router 106.

In one embodiment, the SerDes supports two full-speed data rates: 5 Gbps or 6.25 Gbps. Each SerDes macro is capable of supporting full, half, and quarter data rates using clock dividers in the PLL module. This allows the following supported data rates: 6.25, 5.0, 3.125, 2.5, 1.5625, and 1.25 Gbps. This should be adequate to drive a 6 meter, 26 gauge cable at the full data rate of 6.25 Gbps, allowing for adequate printed circuit board (PCB) foil at both ends.

Figure 7:
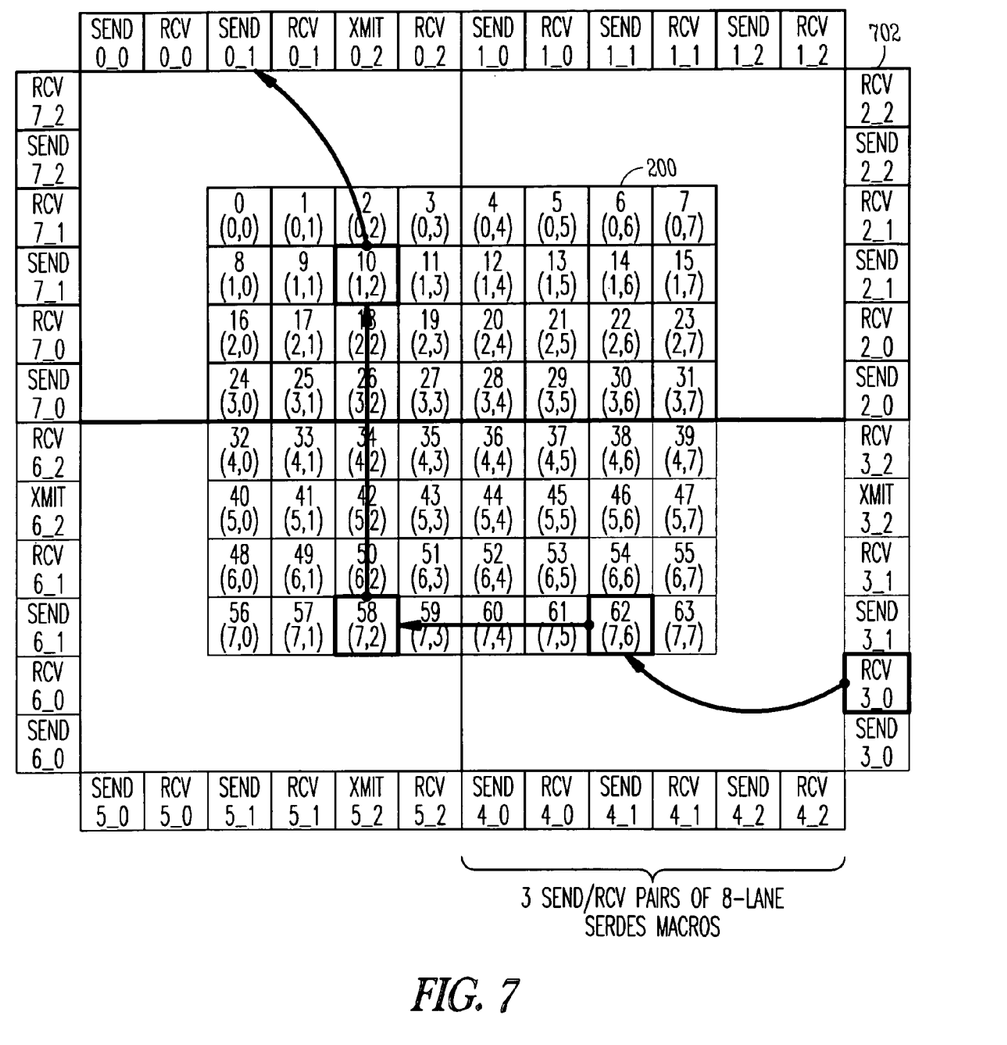
FIG. 7 illustrates packet traversal through the router of FIG. 4.

In one such embodiment, shown in FIG. 7, each port on router 106 is three bits wide, for a total of 384 low voltage differential signals coming off each router 106 (192 transmit and 192 receive). Since the SerDes macro 702 is 8 lanes wide and each router port is only 3 lanes wide, a naive assignment of tiles to SerDes would have 2 and ⅔ ports (8 lanes) for each SerDes macro. Consequently, in such an embodiment it can be useful to aggregate three SerDes macros (24 lanes) to share across eight YARC tiles (also 24 lanes). This grouping of eight tiles is called an octant (tiles belonging to the same octant are shown in FIG. 7) and, in one embodiment, imposes the constraint that each octant must operate at the same data rate.

In one embodiment, the SerDes has a 16/20 bit parallel interface which is managed by the link control block (LCB). In one embodiment, the positive and negative components of each differential signal pair can be arbitrarily swapped between the transmit/receive pair. In addition, each of the 3 lanes which comprise the LCB port can be permuted or "swizzled." The LCB determines which are the positive and negative differential pairs during channel initialization, as well as which lanes are "swizzled". This degree of freedom simplifies the board-level river routing of the channels and reduces the number of metal layers on a PCB for the router module.

Routing

In one embodiment, routing in computing systems 100 and 120 is performed on variable length packets. The first phit of a packet is the header, which contains all the mandatory routing fields, and the last phit of a packet is an end of packet (EOP) phit which contains the packet checksum.

In a folded-Clos topology, packet routing is performed in two stages: routing up to a common ancestor of the source and destination processors, and then routing down to the destination processor. Up routing can use either adaptive or deterministic routing. Down routing, however, is always deterministic, as there is only a single path down the tree from any router to a destination processor.

Some systems 100 and 120 have a memory consistency model that requires that requests to the same address maintain ordering in the network. In such systems, request packets should use deterministic routing. Response packets do not require ordering, and so can be routed adaptively.

Packet routing is algorithmic and distributed. At each hop in the network, routing logic at the head of the input queue calculates the output port for the local router. This is performed using routing registers and an eight-entry routing table 220. The routing logic of route selector 218 is replicated in each tile 200, allowing multiple virtual routers per physical router and providing the needed bandwidth for parallel routing in all 64 tiles 200.

In the embodiments shown in FIGS. 3(a) and (b), there are three types of links (i.e., routes): uplinks, sidelinks and downlinks. Uplinks go from the injection port to a rank 1 router or from a rank n router to a rank n+1 router. Sidelinks go from a rank n router to a peer rank n router (only for R1.5, R2.5 and R3.5 networks). Downlinks go from a rank n router to a rank n−1 router or from a rank 1 router to the destination processor.

En route from the source to the common ancestor, the packet will take either an uplink 110 or a sidelink 108 depending on the class of the network (e.g.: rank 2 or rank 2.5, respectively). Upon arrival at the common ancestor, the router begins routing the packet down the fat tree toward its final destination using the downlinks.

In one embodiment, the down route is accomplished by extracting a logical port number directly from the destination processor number. In one such embodiment, each router 106 in computer systems 100 and 120 has 64 ports which have both a physical number, and an arbitrary logical number. System software performs network discovery when the system is initialized and assigns a logical port number to each physical port number.

Up and down routing will be discussed next. In one embodiment, each tile 200 has a root detect configuration register that identifies the subtree rooted at this router 106, using a 15-bit router location and a 15-bit mask. As an example, the root detect register of a rank-1 router connected to destinations 96-127 would have a router location of 0x0060 (96), and a mask of 0x001F (covering 32 destinations).

If the unmasked bits of the packet destination and the router location match, then the destination processor is contained within the router's subtree, and the packet can begin traversing downward. Otherwise the packet must continue to route up (or over if sidelinks are used).

In one embodiment, routing up or over is accomplished using an eight-entry table 220, where each entry contains a location and mask bits (like the root detect register) identifying a subtree of the network. The packet destination is associatively checked against the routing table entries. The packet matches an entry if its destination is contained within the subtree identified by that entry. The matching entry then provides one or more uplinks/sidelinks that the packet may use to reach its destination. In deterministic routing, the routing logic produces a deterministic exit port for each packet.

In a healthy network, only a single entry is required for up routing, matching the entire network, and identifying the full set of available uplinks. In a system with faults, additional routing table entries are used to provide alternative uplinks for affected regions of the machine. If multiple entries match, then the entry with the highest index is chosen. Thus, entry 0 could be set to match the entire network, with a full uplink mask, and entry 1 could be set to match the subtree rooted at the fault, using a constrained uplink mask that avoids sending packets to a router that would encounter the fault en route to any destination processors in that subtree.

A given network fault casts a shadow over some subtree of endpoints that can be reached going down from the fault. We only need fault entries in the routing table for faults that do not cast a shadow over the local router. A router can also ignore a fault if it cannot be reached from this router (such as faults in another network slice).

In a router with configured sidelinks 108, each peer subtree is given its own routing table entry, which defines the set of sidelinks 108 usable to route to that subtree. No additional routing entries are required for faults.

In one embodiment, packets in the network adaptively route on a per-packet basis. In one embodiment, each packet header (FIG. 6) has an adapt a bit 300 that chooses the routing policy. If a=1 then the packet will choose the output port adaptively during up or siderouting. When routing adaptively, routing table 220 of the input port 190 produces a 64-bit mask of allowable output ports 192. In one embodiment, the column mask is formed by OR-ing together the eligible ports within each column—the resultant 8-bit mask will have bit i set if any of the eight output ports of column i are set in the output port mask produced by the routing table. After constructing the set of allowable columns, we choose the winner (the eventual output column) based on the amount of space available in the row buffer for each column. Ties are broken fairly using a matrix arbiter.

When the packet is sent across the row bus to the chosen column it is accompanied by an 8-bit mask corresponding to the allowable output rows within that column. This row mask is used by the 8×8 subswitch 202 to select an exit row. The row selection at the subswitch is guided by the space available in the column buffers at the outputs, the row with the most space available in the column buffers is chosen.

Packets that are not marked as adaptive (a=0) are routed deterministically based on the output of a hash function. To uniformly spread the packets across the available uplinks, the hash function does an XOR of the input port, destination processor, and optional hash bits if the hash bit (h) is set in the packet header. The hash value is then mapped onto the set of output links identified by the routing table. The input port and destination processor are hashed on to avoid non-uniformities in many-to-one traffic patterns. For request packets, the hash bit is set, and a portion of the packet's address is included in the hash function to further spread the traffic across the uplinks. In this way, we can load balance and still guarantee in-order delivery of packets from source to destination targeting a given address.

Once the packet reaches a common ancestor it will begin routing down the subtree. The first step in routing down is to select a logical downlink number. The down route configuration register contains shift (s) and mask (m) values that are used by first right-shifting the destination processor number by s bits and then masking the bottom m bits to produce the logical output port number for the downlink. A rank 1 router, for example, would have s=0 and m=00011111. The logical port number is converted to a physical port number by a 64-entry port mapping table. The packet proceeds down the tree, shifting and masking the bits of destination processor to determine the downlink at each level, until it reaches the final egress port where it is sent to the processor's network interface.

The Tile

In one embodiment, each tile 200 is broken into four blocks: the link control block (LCB), input buffers, 8×8 subswitch, and column buffers. The input buffer block contains 122 k cells (46% registers, 35% logic, and 19% SRAM) which includes the routing table and routing logic. A considerable amount of this logic is dedicated to handling speculative data forwarding—the LCB passing data up from the data-link layer prior to verifying the CRC—to handle error cases due to transmission errors and soft errors. The 8×8 subswitch accounts for 141 k cells (54% registers, 25% logic, and 21% SRAM), or approximately ⅓ of the logic in the tile. The subswitch contains the row buffers and logic that performs the 8-to-1 arbitration among the row buffers, and a 2-to-1 arbitration amongst the virtual channels. The column buffer block which also performs the same two-stage arbitration as the subswitch only accounts for 62 k cells (71% registers, and 29% logic). The column buffers are implemented in latches, not SRAMs, so the bulk of the area in the column buffers is dedicated to latches. The remaining 111 k cells, or 25% of the tile area, is consumed by the LCB.

Selecting the Radix

The radix at which a network has minimum latency is largely determined by the aspect ratio of the network router. As noted by Kim, aspect ratio is given by:

$$A = (Bt_r \log N)/L$$

where B is the total bandwidth of a router, $t_r$ is the per router delay, N is the size of the network, and L is the length of a packet. In an embodiment where the aspect ratio is 1600, the optimal radix would be 82.

While the optimal radix is 82, this is not a practical value. To simplify implementation and routing, the radix should be a power of 2. A radix that is not a power of 2 would require an integer division and modulo operation to determine the output port from a destination address. In one design approach, we consider radices of 64, and 128. Both of these values give network latency within 2% of the optimal value. Although the higher radix of 128 theoretically leads to lower cost, this theory assumes that port widths can be varied continuously. In one embodiment, we selected a radix of 64 because it gives better performance with our pinout and integral port-width constraints.

In one radix-64 embodiment, area constraints limited us to no more than 200 SerDes on the router chip. A radix-64 router using 3-bit wide ports requires 192 SerDes, fitting nicely within this constraint. A radix-128 router, on the other hand, is limited to 1-bit wide ports requiring 128 SerDes. Such a router has only ⅔ the bandwidth of the radix 64 router, resulting in significantly lower performance.

Some computer systems have cabinet-to-cabinet spacing that requires network links longer than six meters, the maximum length that can be driven reliably at the full signaling rate (6.25 Gb/s) of one embodiment of router 106. Such long links can be realized using optical signaling or using electrical cables with in-line repeaters. However, both of these alternatives carry a significant cost premium. If router 106 supports variable signaling rates (as described for SerDes 702 above) and flexible routing enable, these long links can be realized using electrical signaling over passive cables by using a reverse taper. By reducing the signaling rate on the link, significantly longer electrical cables can be driven. The reduced signaling rate can be offset for by doubling the number of links provisioned at that level of the network (a reverse taper) to preserve network bandwidth.

We chose a high-radix folded-Clos topology for computer systems 100 and 120 because it offered both lower latency and lower cost than alternatives such as a torus network while still providing 8.33 Gb/s of global memory bandwidth. We performed a zero-load latency comparison of the two different topologies. For the high-radix Clos network, radix-64 routers were used. For the 3-D torus, the configurations used were similar to those of the Cray XT3. Uniform random traffic was assumed in calculating the average hop count of the network.

For a small size network, there is a 2× reduction in latency when going from a 3-D torus to a high-radix Clos network. As the size of the network increases, however, there is over a 4× reduction in latency. With the lower hop count, the high-radix Clos not only reduces latency but also reduces cost. This is because network cost is approximately proportional to the total router bandwidth and, with the network bisection held constant, it is proportional to the hop count. Thus, high-radix Clos networks lead to a lower latency and a lower cost network.

There are also several qualitative attributes of the high-radix folded-Clos network which made it an attractive choice. Routing in torus is more complex as turn rules or virtual channels are needed to prevent deadlocks. In addition, complex routing algorithms are needed to properly load balance across adversarial traffic pattern.

In contrast, the folded-Clos has very a straightforward routing algorithm. Because of the path diversity in the topology, load balancing is achieved by selecting any one of the common ancestors. The folded Clos is also cycle-free by design so no additional virtual channels are needed to break deadlock. VC allocation is often the critical path in the router implementation and with fewer VCs, the VC allocation is also simplified.

Partitioning the Router

The radix-64 router 106 can be divided into multiple virtual routers with lower degree. For instance, a single router 106 can serve as two radix-32, four radix-16, or ten radix-6 virtual routers 106. Since each tile 200 has its own set of routing tables 220 and keeps track of the set of allowable exit ports, system software can partition the router into multiple virtual routers by programming the routing tables 220 associated with each virtual router with a set of masks that restricts output traffic to the ports 192 of that virtual router. This flexibility enables a router such as router 106 to be used in systems where packaging constraints require multiple lower radix routers.

Figure 3C:
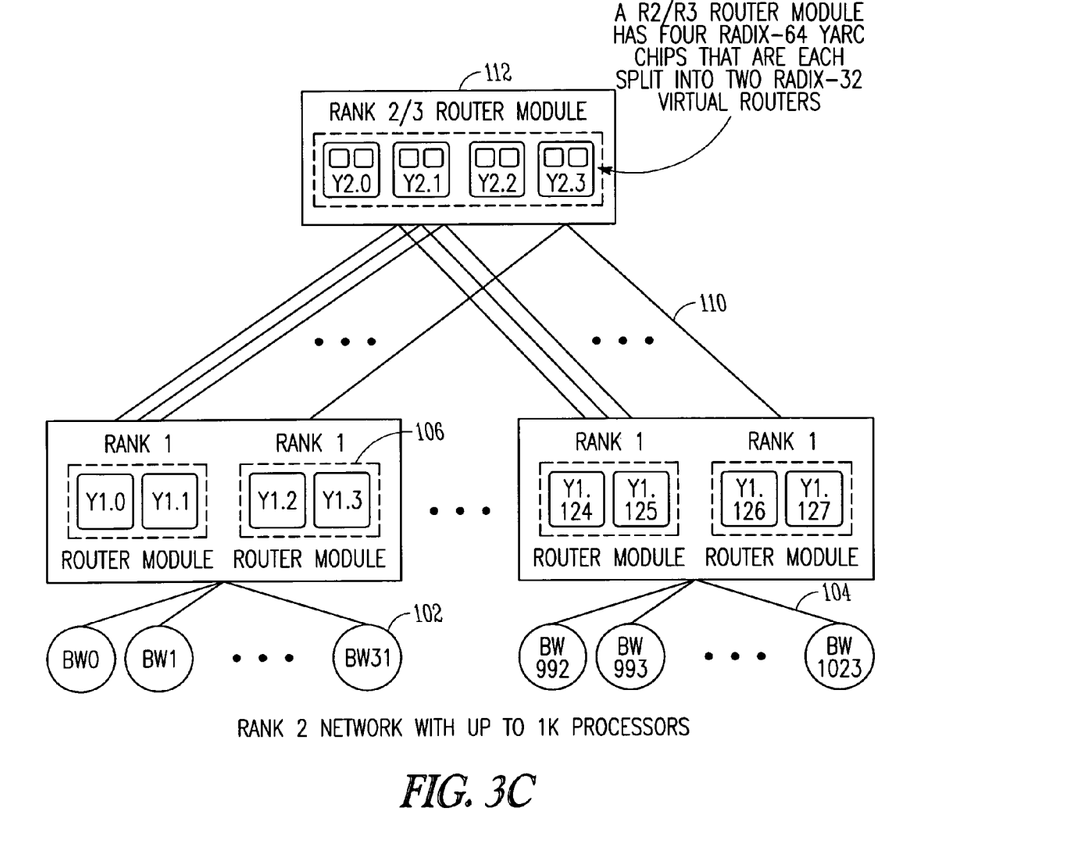

Virtual routers can also be used to support multiple network slices in a single YARC chip 201. For example, a single YARC chip 201 can be configured as two radix-32 routers to provide a radix-32 first stage switch for two of the four BW network slices as shown in FIG. 3(c).

In one embodiment, router 106 employs virtual cut-through flow control externally but uses wormhole flow-control internally due to buffer size constraints. In one such embodiment, the 64 input buffers 210 are each sized deep enough (256 phits) to account for a round-trip credit latency plus the length of a maximum-length packet (19 phits). This enables us to perform virtual cut-through flow control (with packet granularity) on external links.

It may not feasible, however, to size the 512 row buffers or 512 column buffers large enough to account for credit latency plus maximum packet size. Thus wormhole flow control (at flit=phit granularity) is performed over both the row buses and the column channels to manage these buffers. In one embodiment, the row buffers 212 are 16 phits deep and the column buffers 214 are 10 phits deep—large enough to cover the credit latency over the global column lines. Here a maximum-length packet can block traffic from the same input row to other outputs in the same column (by leaving its tail in the row buffer).

In a hierarchical high-radix router 106, a radix-k router is composed of a number of p x p subswitches 202. The number needed is $(k/p)^2$. The cost and performance of the router depend on p. As p is reduced, the design approaches that of a fully buffered crossbar and becomes prohibitively expensive but provides higher performance. As p is increased, the design approaches an input-buffered crossbar and is inexpensive but has poor performance.

To stress the hierarchical organization, we applied worst-case traffic to router 106 in which all of the offered traffic "turns the corner" at a single subswitch 202. With this approach, with an offered load of $\lambda$, one subswitch 202 in each row sees $\lambda$p packets per cycle while the other subswitches in the row are idle. In contrast, uniform random (UR) traffic does not stress the hierarchical organization because it evenly distributes traffic across the k p subswitches 202 in a row with each subswitch 202 seeing only $\lambda$p/k packets per cycle.

We wrote a simulator to evaluate the performance on worst-case traffic for subswitches with degree p of 2, 4, 8, 16, and 32. Subswitches 220 where p is 8, 16, or 32 perform almost identically with a throughput of about 60%. Since a p x p subswitch 202 provides an internal speedup of k/p, (8, 4 and 2 respectively for p=8, 16 and 32), a sustained throughput of 60% provides more than sufficient performance for uniform traffic. With an 8×8 subswitch 202, we can sustain approximately five times the average traffic demand through our subswitch on uniform traffic, providing plenty of headroom for non-uniform traffic patterns.

Although 8, 16, or 32 input subswitches 202 provide nearly identical performance, higher degree subswitches give lower cost because the buffering required is $O(k^2/p)$. However, in one embodiment, we chose the more expensive p=8 configuration for two reasons. First, the higher-degree subswitches required too much time to perform the p-to-1 switch arbitration, which is a timing critical path in the implementation. Early results showed that an 8-to-1 arbitration can be done within a single 800 MHz clock cycle. A 16- or 32-to-1 arbitration would require a longer clock cycle or a pipelined arbiter. Second, a subswitch of size p=8 resulted in a modular design in which the number of ports was equal to the number of subswitches. This enabled us to build a tile that contained a single subswitch, a single input, and a single output.

A higher subswitch size would require each tile to have multiple inputs/outputs, while a smaller subswitch size would require several subswitches to share an input/output complicating the design effort of the tiles.

Fault Tolerance

The high path diversity of a high-radix folded-Clos network can be exploited to provide a degree of fault tolerance. The YARC chip 201 is designed to construct a network that provides graceful degradation in the presence of the following faults: a failed network cable or connector; a faulty router (i.e., a router 106 that stops responding); and a noisy high-speed serial lane that is causing excessive retries.

In a fault-free network, only a single entry in the routing table 220 is necessary to specify the uplinks for the entire system. However, higher-priority table entries can be used to override this master entry to restrict routing to a set of destinations. If a fault occurs at a particular node of the network, the routing tables can be set so that traffic with destinations in the subtree beneath the fault do not route to the fault or any ancestors of the fault. This is done by creating an entry that matches this set of destinations that has an uplink mask with the bits corresponding to the faulty node and/or its ancestors cleared.

In one embodiment, the sender-side of each port maintains a forward progress countdown timer for each virtual channel. If the forward progress timer expires, it indicates that a packet has not flowed in a long time and the router must prevent the error from propagating throughout the network. A forward progress timeout may happen if the attached processor stops accepting requests, causing the network to back pressure into the routers 106. Upon detection of a forward progress timeout, an interrupt is raised to the maintenance controller to inform the system software that a node has stopped responding. The router will begin discarding packets that are destined to port which incurred the timeout.

In one embodiment, a link control block (LCB) handles the data-link layer of the communication stack. It provides reliable packet delivery across each network link using a sliding window go-back-N protocol. It manages the interface between the higher-level core logic and the lower-level SerDes interface (physical layer). The LCB counts the number of retries on a per-lane basis as a figure of merit for that serial channel. System software defines a threshold for the number of tolerable retries for any of the serial lanes within the 3-lane port.

In one embodiment, if the LCB detects that the retry count exceeded the threshold, it will automatically decommission the noisy lane and operate in a degraded (2-bit wide or 1-bit wide) mode until the cable can be checked and possibly replaced. This allows the application to make forward progress in the presence of persistent retries on a given network link.

If all the lanes in the link are inoperable and must be disabled, the LCB will deassert the link active signal to the higher-level logic which will cause a system-level interrupt to the maintenance controller and cause the sending port to discard any packets destined to the dead port. This prevents the single link failure from cascading into the rest of the network.

A folded-Clos topology is cycle free and under normal operating conditions is deadlock-free. In one embodiment, router 106 is designed to ensure the following invariant: once a packet begins traversing downward, it remains going downward until it reaches the destination. That is, packets that arrived from an uplink must route to a downlink. This prevents packets from being caught in a cycle containing uplinks and downlinks. If the router is configured properly, this should never happen. However, software and the programmers who create it are fallible. This dynamic invariant should help reduce the debugging time when investigating early-production routing software.

Non-uniform traffic can cause local hot spots that significantly increase contention in interconnection networks. To reduce this network load imbalance, in one embodiment router 106 performs two types of load balancing: hashing of deterministic routes to split bulk transfers up over multiple paths; and adaptive routing.

A system and method for enhancing diversity in routing is described in "LOAD BALANCING FOR COMMUNICATIONS WITHIN A MULTIPROCESSOR COMPUTER SYSTEM," U.S. patent application Ser. No. 12/107,019, filed Apr. 21, 2008, the description of which is incorporated herein by reference.

Adaptive Routing

Implementing an adaptive routing scheme in a high-radix router is particularly challenging because of the large number of ports involved in the adaptive decision. Ideally, we would look at the congestion at all possible output ports (at most 32) and choose the queue with the most free space. Unfortunately, this is unrealistic in a 1.25 ns clock cycle. Instead, in keeping with the hierarchical organization of the router, we break the adaptive decision into two stages: choosing the output column, and choosing the output row within that column.

We first choose the column, c, by comparing the congestion of the row buffers in each of the c row buffers identified by bits in the column mask. A full eight-way, four-bit comparison of row buffer depths was too expensive. Instead we look only at the most significant bit (MSB) of the row buffer depth, giving priority to buffers that are less than half full. We then select the column based on a round-robin arbitration, and route to the row buffers of the tile 201. This algorithm ignores the number of eligible output ports in each of the target columns, giving no preference to a column with more eligible outputs. However, columns with more eligible outputs will tend to drain faster, leading to more space in their subswitch row buffers.

In the second stage of the adaptive route, we choose the output row based on the bits of the row mask which are set. The row mask identifies the set of valid output ports within the chosen column. We again must rely on imperfect information to choose the output tile based on the depth of the column buffers in the r rows, where r is the number of bits set in the row mask. We choose among the rows by comparing two bits of the 4-bit column buffer depth (which is at most 10). The most significant bit indicates if the column buffer is "almost full" (i.e. 8 or more phits in the buffer), and the upper two-bits together indicate if the column buffer has more than 4 phits but less than 8 phits—corresponding to "half full." Finally, if the upper two bits of the buffer size are zero, then the column buffer is "almost empty." The adaptive decision will choose the column buffer based on its current state, giving preference to those ports which are "almost empty" then those that are "half full" and finally those buffers that are "almost full."

A system and method for flexible routing, including adaptive routing, is described in "FLEXIBLE ROUTING TABLES FOR A HIGH-RADIX ROUTER," U.S. patent application Ser. No. 12/107,016, filed Apr. 21, 2008, the description of which is incorporated herein by reference.

Router 106 is a high-radix router used in the network of computer systems 100 and 120. Computer systems 100 and 120 that use routers 106 with sixty-four 3-bit wide ports, scale up to 32K processors using a folded-Clos topology with a worst-case diameter of seven hops. In one embodiment, each router 106 has an aggregate bandwidth of 2.4 Tb/s and a 32K-processor BlackWidow system has a bisection bandwidth of 2.5 Pb/s.

Router 106 uses a hierarchical organization to overcome the quadratic scaling of conventional input-buffered routers. A two level hierarchy is organized as an 8×8 array of tiles. This organization simplifies arbitration with a minimal loss in performance. The tiled organization also resulted in a modular design that could be implemented in a short period of time.

The architecture of router 106 is strongly influenced by the constraints of modern ASIC technology. For instance, router 106 takes advantage of abundant on-chip wiring to provide separate column buses from each subswitch to each output port, greatly simplifying output arbitration. To operate using limited on-chip buffering, router 106 uses wormhole flow control internally while using virtual-cut-through flow control over external channels.

To reduce the cost and the latency of the network, computer systems 100 and 120 use a folded-Clos network which, in some cases, is modified by adding sidelinks 108 to connect peer subtrees and statically partition the global network bandwidth. Such networks are superior to torus networks in terms of fault tolerance and bandwidth spreading. In some embodiments, both adaptive and deterministic routing algorithms are implemented in the network to provide load-balancing across the network and still maintain ordering on memory requests.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A router, comprising:
   a plurality of subswitches connected in a n rows x p columns matrix, wherein each subswitch includes n inputs and p outputs, wherein both n and p are integers greater than one;
   a plurality of input ports;
   a plurality of output ports, wherein each output port includes a multiplexer and an arbiter for selecting data to be switched onto the output port via the multiplexer;
   a plurality of row busses, each row bus coupling one of the input ports to the p subswitches in the same row of the n x p matrix of subswitches, wherein each row bus receives data from one of the plurality of input ports and distributes the data to two or more of the plurality of subswitches in the same row of the n x p matrix; and
   a plurality of column channels, wherein each column channel connects one of the outputs of one of the subswitches to an input of one of the multiplexers of a subswitch in the same column of the n x p matrix;
   wherein each row bus includes a route selector, wherein the route selector includes a routing table which is used to select an output port for each of one or more packets and to route the packet through one of the row busses to the selected output port.

2. The router of claim 1, wherein n equals p.

3. The router of claim 1, wherein the router supports m virtual channels, wherein m is an integer greater than one, and wherein each virtual channel for each input port has its own row bus.

4. The router of claim 1, wherein the router supports wormhole routing.

5. A router, comprising:
   a plurality of subswitches connected in a n rows x p columns matrix, wherein each subswitch includes n inputs and p outputs, wherein both n and p are integers greater than one;
   a plurality of input ports;
   a plurality of output ports, wherein each output port includes a multiplexer and an arbiter for selecting data to be switched onto the output port via the multiplexer;
   distribution means, connecting each of the input ports to the p subswitches in the same row of the n x p matrix, for receiving data from one of the plurality of input ports and for distributing the data to two or more of the plurality of subswitches in the same row of the n x p matrix; and
   a plurality of column channels, wherein each column channel connects one of the outputs of one of the subswitches to an input of one of the multiplexers of a subswitch in the same column of the n x p matrix;
   wherein the distribution means includes a route selector, wherein the route selector includes a routing table which is used to select an output port for each of one or more packets and to route the packet through one of the row busses to the selected output port.

6. The router of claim 5, wherein n equals p.

7. The router of claim 5, wherein the router supports m virtual channels, wherein m is an integer greater than one, and wherein each virtual channel for each input port has its own row bus.

8. The router of claim 5, wherein the router supports wormhole routing.

9. A computer system, comprising:
   a plurality of processor nodes;
   a plurality of first routers; and
   a plurality of second routers;
   wherein each first router is connected to a processor node and to two or more second routers and wherein each first router includes:
      a plurality of subswitches connected in a n rows x p columns matrix, wherein each subswitch includes n inputs and p outputs, where n and p are integer values greater than one;
      a plurality of input ports;
      a plurality of output ports, wherein each output port includes a multiplexer and an arbiter for selecting data to be switched onto the output port via the multiplexer;
      a plurality of row busses, each row bus coupling one of the input ports to the p subswitches in the same row of the n x p matrix of subswitches, wherein each row bus receives data from one of the plurality of input ports and distributes the data to two or more of the plurality of subswitches in the same row of the n x p matrix; and
      a plurality of column channels, wherein each column channel connects one of the outputs of one of the sub switches to an input of one of the multiplexers of a subswitch in the same column of the n x p matrix;
      wherein each row bus includes a route selector, wherein the route selector includes a routing table which is used to select an output port for each of one or more packets and to route the packet through one of the row busses to the selected output port.

10. The computer system of claim 9, wherein n equals p.

11. The computer system of claim 9, wherein the router supports m virtual channels, wherein m is greater than one, and wherein each virtual channel for each input port has its own row bus.

12. The computer system of claim 9, wherein the router supports wormhole routing.

13. A method of implementing a radix-N router, comprising:
   connecting a plurality of subswitches in a p x p matrix, wherein each subswitch includes p inputs and p outputs, wherein p is greater than one;
   adding a plurality of row busses, each row bus coupling one of the input ports to the p subswitches in the same row of the n x p matrix of subswitches, wherein each row bus receives data from one of the plurality of input ports and distributes the data to two or more of the plurality of subswitches in the same row of the n x p matrix;
   routing a packet from one of N input ports of the radix-N-router to one of the plurality of subswitches, wherein routing includes accessing a routing table to determine an appropriate subswitch for receiving the packet;
   connecting a column channel between each of the outputs of each of the subswitches and an input of each of N multiplexers of a subswitch in the same column of the n x p matrix; and
   routing the packet to one of N output ports via one of the N multiplexers.

* * * * *